(12) United States Patent
Kremer et al.

(10) Patent No.: US 7,182,099 B2
(45) Date of Patent: Feb. 27, 2007

(54) TAP FOR GAS OR LIQUID CYLINDER

(75) Inventors: Paul Kremer, Walferdange (LU); Jacques Schmit, Eppeldorf (LU)

(73) Assignee: Luxembourg Patent Company (LU)

( * ) Notice: Subject to any disclaimer, the term of this patent is extended or adjusted under 35 U.S.C. 154(b) by 327 days.

(21) Appl. No.: 10/803,271

(22) Filed: Mar. 18, 2004

(65) Prior Publication Data

US 2004/0187921 A1 Sep. 30, 2004

(30) Foreign Application Priority Data

Mar. 28, 2003 (EP) .................................. 03100812

(51) Int. Cl.
*F16K 1/30* (2006.01)
*F16K 17/36* (2006.01)

(52) U.S. Cl. ................... 137/614.2; 137/68.14

(58) Field of Classification Search ............. 137/68.11, 137/68.14, 329.4, 614.2, 630.22
See application file for complete search history.

(56) References Cited

U.S. PATENT DOCUMENTS

| 160,459 | A | * | 3/1875 | Nottingham ........... 137/630.22 |
| 409,217 | A | * | 8/1889 | Mears ..................... 137/68.11 |
| 517,550 | A | * | 4/1894 | Messinger ................ 137/329.4 |
| 638,974 | A | * | 12/1899 | Messinger ................ 137/329.4 |
| 727,195 | A | * | 5/1903 | Philp ...................... 137/630.22 |
| 1,136,606 | A | | 4/1915 | Loyd et al. |
| 2,563,244 | A | * | 8/1951 | Holicer ..................... 137/614.2 |
| 2,678,799 | A | | 5/1954 | St. Clair |
| 2,868,224 | A | * | 1/1959 | Karlsson et al. ........ 137/630.22 |
| 3,645,286 | A | * | 2/1972 | Follett ..................... 137/68.14 |
| 4,527,587 | A | * | 7/1985 | Fairlamb ................. 137/614.2 |
| 5,127,436 | A | * | 7/1992 | Campion et al. ........ 137/614.11 |
| 5,894,859 | A | | 4/1999 | Pavlicek |
| 2004/0051073 | A1 | | 3/2004 | Estrems |

FOREIGN PATENT DOCUMENTS

| DE | 803872 | 4/1951 |
| DE | 896139 | 11/1953 |
| FR | 1370110 | 6/1964 |
| FR | 2659412 | 9/1991 |
| FR | 2816387 | 5/2002 |
| FR | 2817940 | 6/2002 |
| GB | 07163 | 0/1911 |
| WO | 0246652 | 6/2002 |

OTHER PUBLICATIONS

Search report from corresponding application EP 03 10 0812.

* cited by examiner

*Primary Examiner*—John Rivell
(74) *Attorney, Agent, or Firm*—Polster, Lieder, Woodruff & Lucchesi, L.C.

(57) ABSTRACT

A tap for a gas or liquid cylinder is provided that comprises an inverted seat primary valve located in a main portion of a tap body and a secondary check valve spring biased into closed position and located below the lower end of a threaded section of a root end portion of the tap body. Both valves are actuated by an elongated stem extending from the main portion of the tap body into the root end portion. When the tap is fixed to a gas or liquid cylinder, the secondary check valve is located in the cylinder, thereby remaining operative when the tap body is sheared-off at a location where it extends out from a cylinder tap aperture.

7 Claims, 2 Drawing Sheets

TAP FOR GAS OR LIQUID CYLINDER

CROSS-REFERENCE TO RELATED APPLICATIONS

This application claims priority under 35 U.S.C. §119 to European application No. 03100812.1 which was filed Mar. 28, 2003.

BACKGROUND OF THE INVENTION

1. Field of the invention

The present invention relates to a tap for a gas or liquid gas cylinder, particularly of a vehicle, such as a trailer, and more particularly concerns such a tap preventing uncontrolled spillage of the cylinder contents in case the tap body is sheared-off externally of the cylinder leaving a portion of a tap root end within a cylinder aperture.

2. State of the Art

When a tap is attached to a gas or fluid cylinder its root end portion is at least partly threadably engaged in a tap aperture of the gas or liquid cylinder. One portion of the tap body is thus received within the cylinder tap aperture whereas another body portion of the tap extends from the cylinder tap aperture to the exterior of the cylinder. In case of an accident lateral or axial external forces may be applied to the portion of the tap body extending from the cylinder tap aperture, which forces may be of sufficient magnitude to cause shearing-off of the tap body approximately at the location where it extends out from the cylinder tap aperture. If the tap is sheared-off the main portion of the tap body provided with a primary valve for opening or closing a fluid flow passage through the tap is separated from a portion of the tap body that remains engaged within the cylinder tap aperture. Thus, in case of loss of the primary valve the contents of the cylinder may flow out, which is dangerous particularly if the cylinder contains toxic, inflammable or explosive gases or fluids. In the prior art it has been proposed to provide the tap upstream of the primary valve (i.e. between the primary valve and the cylinder interior) with an auxiliary check valve that is urged into closed position by a biasing spring and also by the pressure of the fluid contained in the cylinder. In the prior art this known check valve is arranged either externally of the cylinder or close to the primary valve so that it risks to be sheared-off together with the tap body portion containing the primary valve, or at least to be damaged by the external forces to such an extent that it is no longer capable to tightly close the cylinder aperture.

Check valves are also known which are spring biased to open position and closed only by the pressure in the cylinder in case of failure of the primary valve actuating mechanism.

BRIEF SUMMARY OF THE INVENTION

The object of the present invention is to provide an improved tap for a gas or liquid cylinder preventing flow-out of the fluid contained in the cylinder in case of shearing-off of the tap body portion extending out from the cylinder tap aperture or deformation of the tap body resulting in failure of the primary valve.

According to the invention the tap for a gas or liquid cylinder, particularly of a vehicle, such as a trailer, comprises:

a tap body having a longitudinal axis, a root end portion having a threaded section on an outer circumferential surface thereof, and a main body portion on one axial end of said threaded section, the other axial end of said threaded section adapted to be threaded into a tap aperture of a gas or liquid cylinder;

an inversed seat primary valve located in said main body portion and having an annular seat surface and an annular sealing ring fluid tightly engageable with the seating surface, one of said seat surface and said sealing ring being mounted stationary in said valve body;

a secondary check valve axially spaced from the other axial end of said threaded section, whereby said check valve is in the cylinder interior when the tap is fixed to the cylinder to prevent damage to the check valve by lateral shearing forces acting on the tap body externally of the cylinder, said secondary check valve having a check valve element spring biased towards a closed position;

a stem axially movably mounted in said tap body, said stem extending through said one of said seat surface and said sealing ring, the other of said seat surface and said sealing ring being on said stem on a side of said one of said seat surface and said sealing ring that faces towards the root end portion, said stem having an extension portion prolongating said stem from said primary valve to extend into said root end portion; and a stem actuator coupled to said stem to move said stem axially in one direction to open both of said valves and in an opposite direction to allow said check valve to close and to close said primary valve.

Accordingly, the secondary check valve is spaced from the threaded section of the root end portion on the side of the root end portion opposite to the tap main body portion containing the primary valve. When the tap is engaged in the tap aperture of the cylinder the secondary check valve is therefore deeply positioned within the cylinder so that it remains in place after shearing-off of the tap body externally of the cylinder and is and protected against deformation by external forces acting on the tap main body portion so that it remains fully operative after deformation of the tap body.

In the preferred embodiment a reduced diameter section extends from the threaded section of the root end portion in a direction opposite to the direction in which the tap main body portion extends from the threaded section and a check valve seat surface is formed at the free end of the reduced diameter section. This insures that the secondary check valve does not contact the gas cylinder wall so as to prevent damage to the check valve caused by deformation of the root end portion when large external forces are applied to the tap main body portion.

The check valve may be mounted in a cup-shaped member or a sleeve tube fixedly secured to the reduced diameter section, and the check valve element may comprise a ball element or a tubular piston element.

In the root end portion there may be provided an internal thread to allow for connection of an actuating device to the root end portion after shearing-off of the tap main body portion for opening the primary check valve to allow for emptying the container.

BRIEF DESCRIPTION OF THE SEVERAL VIEWS OF THE DRAWINGS

The invention will now be described in greater detail with respect to the accompanying drawings in which.

DETAILED DESCRIPTION OF THE INVENTION

Figure 1:
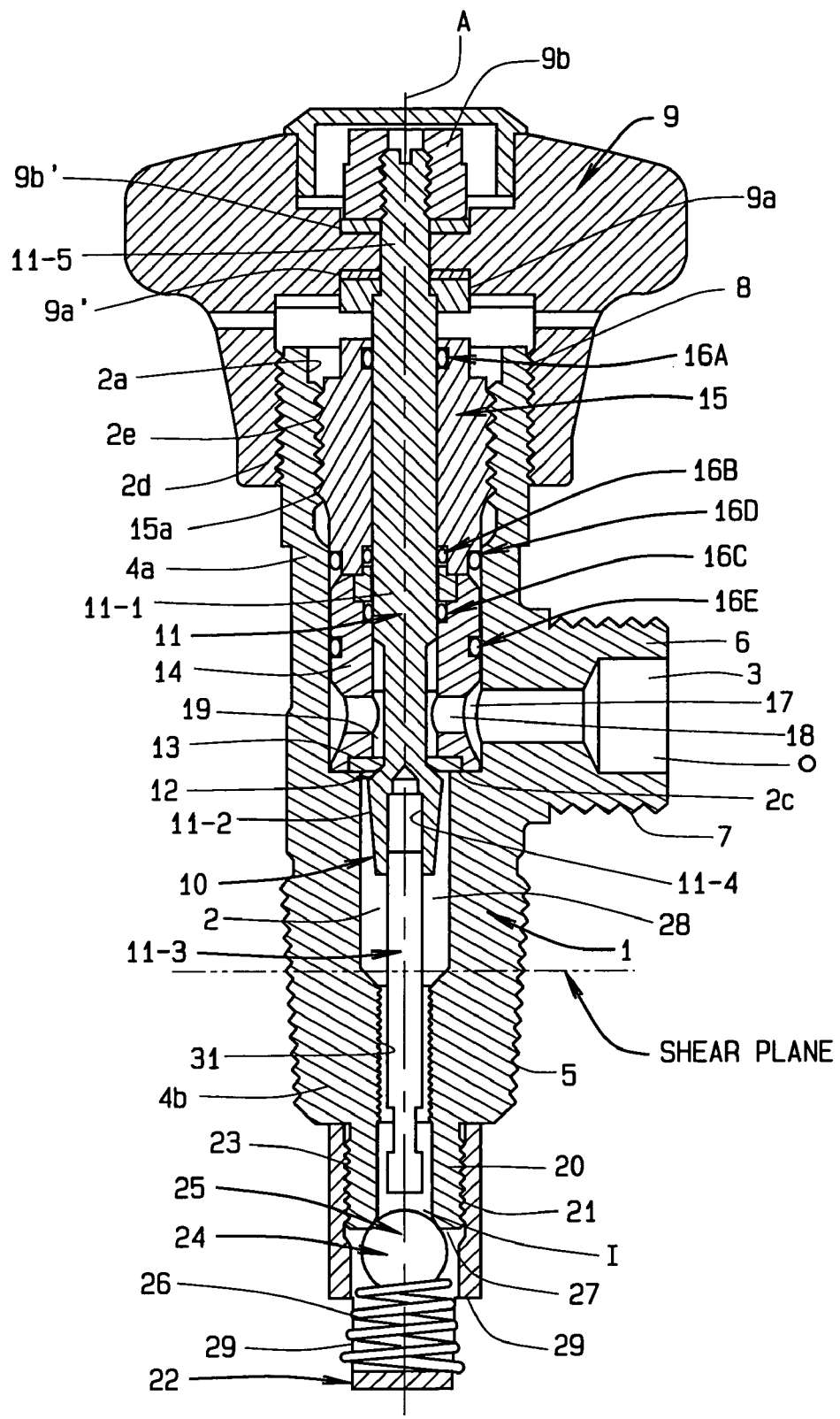
FIG. 1 shows a tap according to one embodiment of the invention in longitudinal section.

Referring first to FIG. 1 in which the tap of the invention is shown in upright position, it can be seen that the tap comprises a tap body 1, a reversed seat primary valve 10, a secondary check valve 24, a stem 11 to actuate both valves 10 and 24 and a stem actuator comprising a hand-operated handle 9.

The tap body 1 has a longitudinal axis A that extends vertically in FIG. 1. The tap body 1 has an upper main body portion 4a and a lower root end portion 4b. The root end portion 4b has a conical threaded section 5 that tapers downwardly to a reduced diameter. The root end portion 4b has a cylindrical reduced diameter section 20 extending downwardly from the lower or reduced diameter end of the conical threaded section 5 and the main body portion 4a extends upwardly from the opposite, upper end or large diameter end of the conical threaded section 5. The outer diameter of reduced diameter section 20 is smaller than the small diameter of the conical section 5. For certain applications the threaded section 5 may be cylindrical. A longitudinal bore 2 concentric to the longitudinal axis A extends completely through the tap body 1 from the upper to the lower end thereof. The longitudinal bore 2 has a counterbore 2a extending from the upper end of the tap body 1 downwardly and terminating at an axially and upwardly facing shoulder 2c within the main body portion 4a. The main body portion 4a further has at its upper end an outer threaded portion 2d as well as an inner threaded portion 2e in the counterbore 2a proximate to the upper open end thereof. The main body portion 4a further has a laterally extending connection portion 6 that has an outer thread 7 thereon.

Disposed within the main body portion 4a between the upper and lower ends thereof is the inversed seat primary valve 10 which comprises a annular sealing ring 13 retained on the axially facing shoulder 2c of the counterbore 2a by an annular sealing ring retainer 14. The primary valve 10 further has a conical upwardly facing annular seat surface 12 on the stem 11, as will be further described later herein. The sealing ring retainer 14 is locked in position by a locking ring 15 that has an external thread 15a thereon that is engaged within the internal thread 2e of the counterbore 2a.

At the lower end of the tap the secondary check valve 24 is mounted to the root end portion 4b. The check valve 24 comprises a ball element 25 and a conical helically wound spring 26 urging the ball element 25 upwardly in fluid tight engagement with an annular seat surface 27 provided adjacent the lower end of the reduced diameter section 20. The check valve 24 is securely attached by a cup-shaped member 22 that has an internal thread 23 engaging an external thread 21 of the reduced diameter section 20. The cup-shaped member 22 has apertures 29 at its lower end portion for fluid flow into and out of the cup-shaped member 22.

The stem 11 comprises a first or upper portion 11-1 extending through the annular sealing ring 13, the sealing ring retainer 14 and the locking ring 15 and out of the tap body 1 at the upper end thereof. At its lower end the upper portion 11-1 of the stem 11 has a radially thickened lower end portion 11-2 disposed below the annular sealing ring 13 and having at its upper end the conical upwardly facing annular seat surface 12. The stem 11 further has a second or lower extension portion 11-3 received at its upper end in an axially extending, downwardly opening bore 11-4 of the thickened lower end portion 11-2 of the upper stem portion 11a and fixedly secured therein. The lower stem portion 11-3 extends downwardly from the thickened portion 11-2 into the root end section 4b and has its lower end spaced slightly upwardly from the check valve ball 24 when the inversed seat primary valve 10 is closed, namely when the seat surface 12 on the stem 11 is in fluid tight engagement with the annular sealing ring 13. The reversed seat primary valve 10 is opened when the stem 11 is moved downwardly to move the annular seat surface 12 downwardly away from the annular sealing ring 13. Shortly after opening of the primary valve 10 the lower end of the lower stem portion 11-3 contacts the check valve ball element 25 to move it away from the seat 27. When the stem 11 is moved in the opposite direction, namely upwardly, the check valve 24 is allowed to close first by the biasing force of the spring 26 and the pressure of the fluid contained in the cylinder and thereafter the primary valve 10 is also closed.

The stem 11 is actuated upwardly and downwardly along the longitudinal axis A by means of the handle 9. The handle 9 has an internally threaded portion 8 engaging the external thread 2d at the upper end of the valve body 1. The handle 9 is mounted on an upper reduced diameter end portion 11-5 of the upper stem portion 11-1 for free rotation about the stem 11. The handle 9 is mounted to the stem 11 to move the stem 11 axially in both directions with the handle 9 when the handle 9 is rotated about axis A and moves upwardly and downwardly with respect to the tap body 1 due to the engagement of the internal handle thread 8 with the external thread 2d at the upper end of the tap body 1. The handle 9 is axially retained on the stem 11 between a lower support ring 9a engaging an upwardly facing shoulder at the upper end of the stem upper portion 11-1 and a nut member 9b threaded onto the upper reduced diameter end portion 11-5 of the upper stem portion 11-1. Friction-reducing washers 9a', 9b' are provided between the support ring 9a and the handle 9 and between the nut 9b and the handle 9, respectively.

Two seal rings 16A and 16B are provided between the upper stem portion 11-1 and the locking ring 15. A seal ring 16C is provided between the upper stem portion 11-1 and the annular sealing ring retainer 14. A further sealing ring 16D is provided between the locking ring 15 and the inner wall of the counterbore 2a and an additional sealing ring 16E is provided between the outer circumferential surface of the retainer 14 and the inner circumferential surface of the counterbore 2a.

A fluid flow passage 28 is formed in the longitudinal bore 2 and extends from a tap body inlet I at the lower end of the reduced diameter section 20 of the root end portion 4b around the lower portion 11-3 of the stem 11 and around the thickened lower portion 11-2 of the upper stem portion 11-1 up to the annular sealing ring 13. A further flow passage 3 is formed in the laterally extending connection portion 6, and extends from a tap body outlet O into the counterbore 2a above the annular sealing ring 13 and is in communication through circumferentially spaced orifices 18 formed in the sealing ring retainer 14 with an annular flow passage 19 formed within the retainer 14 by a reduced diameter portion formed in the upper stem portion 11-1 above the radially thickened end portion 11-2 thereof.

When the primary valve 10 is open both flow passages 28, 3 and 19 are in fluid flow communication with one another and when the check valve 24 is also open gas a liquid flow is allowed through the tap from inlet I to outlet O in a fluid discharge mode or in the opposite direction in a cylinder filling mode. The flow passages 28, 3 and 19 are sealed-off from one another when the primary valve 10 is closed. The check valve 24 is then also closed and gas or liquid flow through the tap is shut-off It can accordingly be seen that the check valve 24 is located at the lowermost extreme end of the root end portion 4b below the reduced diameter section 20 and in case the tap body 1 is sheared-off at the shear plane shown in FIG. 1 the check valve 24 remains fully operative on the lowermost portion of the root end portion 4b that remains within the threaded tap aperture of the cylinder. The secondary check valve 24 is spaced at a substantial distance downwardly from the shear plane and is located in the cylinder so that it will not be damaged or otherwise deformed when the tap body 1 is sheared-off along the shear plane. The secondary check valve 24 also remains fully operative if the tap body portion is not sheared-off by external forces exerted to the tap body externally of the cylinder but only deformed by such forces. Moreover, the smaller diameter section 20 on which the secondary check valve 24 is mounted is not in direct contact with the cylinder and is therefore unlikely to be deformed when the threaded section 5 is deformed by large pulling-out forces that may be applied thereto when the tap body main portion 4a is sheared-off or laterally deformed. As the reduced diameter section 20 is not deformed the secondary check valve 24 remains fully effective to tightly close the cylinder aperture. Internal threads 31 within the root end portion 4b below the shear plane shown in FIG. 1 allow for connection of an actuating device to the root end portion 4b after shearing-off of the tap main body portion 4a for opening the check valve 24 to allow for emptying of the cylinder.

Figure 2:
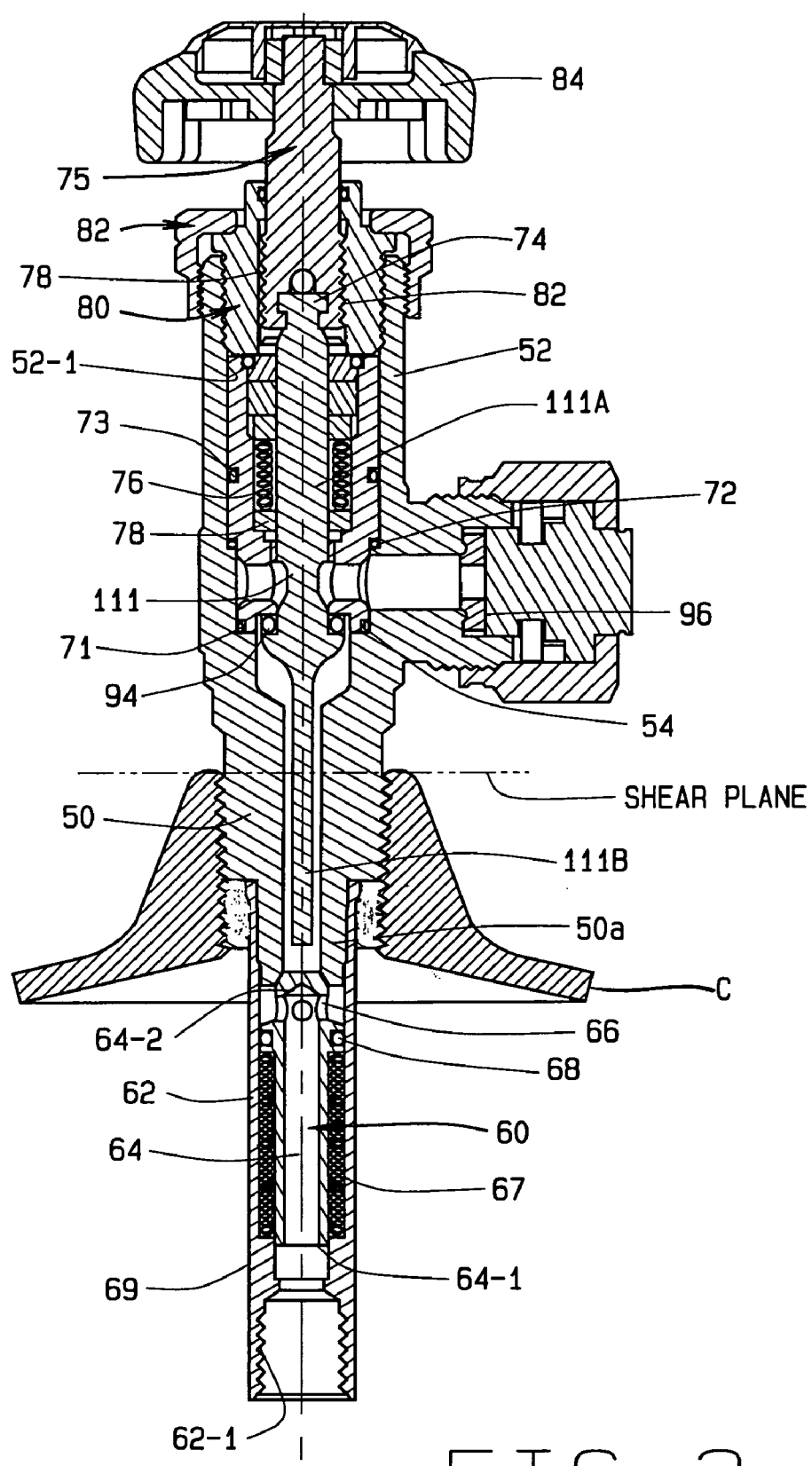
FIG. 2 shows another embodiment of a tap of the invention in longitudinal section.

Referring now to FIG. 2, there is shown another embodiment of the tap of the invention also in upright position. The tap of FIG. 2 will be described only as far as it is distinguished from the tap of the FIG. 1 embodiment. First, in FIG. 2 the neck end of the cylinder C is shown in which the tap body root end portion 50 is engaged. A modified secondary check valve 60 is mounted in an open ended sleeve tube or retention member 62 fixedly secured to the lower reduced diameter section 50a of the root end portion 50. The check valve 60 comprises a tubular piston element 64 provided with a piston skirt having a lower open end 64-1. The check valve 60 further has a reduced diameter closed upper end or piston head 64-2 urged against a seat surface at the lower end of the reduced diameter section 50a by a helical cylindrical spring 67 surrounding the tubular piston element 64 between spring seating surfaces provided on an inwardly extending annular shoulder 69 of the sleeve tube 62 and an outwardly extending annular flange 68 of the tubular piston element 64. The piston element 64 is guided for axial movement in the sleeve tube 62 by the annular piston flange 68 and the sleeve tube annular shoulder 69. The piston element 64 has between the closed upper end 64-2 and the annular flange 68 a plurality of orifices 66 placing the interior of the piston element 64 in communication with the exterior thereof below the reduced diameter closed upper end 64-2 thereof. The sleeve tube 62 has at its lower end an internal thread 62-1 for connecting a plunger tube (not shown) thereto. A sealing ring is disposed in an annular groove of the annular flange 68 of the tubular piston element 64.

The FIG. 2 embodiment is further distinguished from the FIG. 1 embodiment in that the stem 111 has the upper stem portion 111A integrally formed in one piece with the lower stem portion 111B. Further, the annular seal 94 of the inverted seat primary valve 54 is provided on the stem 111 and the annular seat surface 96 of the primary valve 54 is provided on a fixed tubular seat member 76 that surrounds the stem 111 and is comparable to the sealing ring retainer 14 of the FIG. 1 embodiment.

To prevent fluid leakage along the upper portion 111A of the stem 111 a seal structure 78 is provided within the annular seat member 76. The seal structure 78 is known in the art and will not be further described herein. Further seals 71, 72, 73 are provided to prevent leakage around the annular seat member 76 and along the inner circumferential surface of the counterbore 52-1 in the main body portion 52.

Another stem actuator is also provided which comprises a handle 84 having an axial post 75 fixedly secured thereto. The post 75 is axially aligned with the stem 111 and coupled thereto by a coupler 74 to permit rotational movement of the post 75 relative to the axially movable stem 111. The annular or tubular seat member 76 is retained in position by an annular locking ring 80 threaded into the upper end of the counterbore 52-1 and in turn retained by a tap bonnet 82 threadably engaged with the outer surface of the main body portion 52. The post 75 has an outer threaded portion engaged with a threaded portion 82 on the internal surface of the annular locking ring 80. When handle 84 is rotated in opposite directions it moves upwardly and downwardly and transmits this motion to the stem 111 to move it axially.

In other respects the embodiment of FIG. 2 is identical to the embodiment of FIG. 1, except that the root end portion 50 does not have an internal thread for receiving an actuating device to open the secondary check valve 60 when the tap body has been sheared-off in the shear plane shown in FIG. 2.

Although two different embodiments of the invention have been described in detail hereinbefore it is to be understood that numerous modifications or variations can be made thereto within the scope and spirit of the invention. For example, another stem actuating means can be used, such as a hydraulic, pneumatic or electric actuating means. Also the reduced diameter section 20 of FIG. 1 or 50a of FIG. 2 could be made longer and the check valve arranged within the reduced diameter section. The check valve seat surface 27 (FIG. 1) would then be intermediate the opposite ends of section 20 or 50a and not at the free end thereof.

The invention claimed is:

1. A tap for a gas or liquid cylinder, comprising:
  a tap body having a root end portion, said root end portion having a free end and an exteriorly threaded section adapted to be engaged in a threaded opening of a gas or liquid cylinder;
  an elongated valve actuating stem means mounted in said tap body, said stem means having a longitudinal axis;
  a primary valve means provided in said tap body at a side of the root end portion opposite said free end; and
  a secondary check valve means having a movable piston element urged by a biasing spring to a closed position in engagement with a check valve seat on the root end portion; said piston element being disposed in an open-ended sleeve tube retention member fixed to the root end portion of the tap body,
  said stem means being axially movable in a first direction to open said primary valve means to permit fluid flow through said tap body from an inlet to an outlet thereof, and in a second opposite direction to close said primary valve means to shut-off fluid flow from said inlet to said outlet of said tap body, said stem means holding said secondary check valve means in an open position at least when said primary valve means is in an open position, said root end portion having a reduced diameter section extending between the exteriorly threaded section and the free end of the root end portion, said reduced diameter section having a smaller external diameter than the exteriorly threaded section and the check valve seat being formed on said reduced diameter section, and said retention member having one end thereof fixed to said root end portion about said reduced diameter section and being adapted at a free opposite open end thereof to permit connection of an accessory to said retention member;

wherein said piston element comprises a piston head engageable with said check valve seat and a piston skirt extending from said piston head towards said free opposite end of said retention member, said piston skirt being guided for axial movement in the retention member in an inner annular shoulder thereof and by an outer annular flange of said piston element, said check valve biasing spring being disposed about said piston skirt, said piston skirt having a hollow interior closed at a first end thereof by said piston head, said piston skirt hollow interior being in fluid communication with the interior of the retention member at a second opposite open end of the piston skirt, and by at least one orifice through the piston element between said closed first end and the flange of the piston element.

2. A tap according to claim 1, wherein the check valve seat is formed at the free end of the reduced diameter section.

3. A tap according to claim 1, wherein said biasing spring is disposed in a spring chamber and the fluid flow path through the check valve means bypasses said spring chamber.

4. A tap according to claim 1, wherein the retention member is threaded at its free opposite opened end to permit connection of an accessory to said retention member.

5. A tap according to claim 1, wherein said primary valve means is an inverted seat valve means, said stem means being slightly spaced from said piston element when said primary valve means is in a closed position so that said primary valve means is opened first followed by opening of said secondary check valve means when said stem means is moved in a said first direction, and the secondary check valve means is allowed to close first followed by closing of the primary valve means when said stem means is moved in said second opposite direction.

6. A tap according to claim 1, wherein said retention member has a smaller external diameter than the minimum base diameter of the exteriorly threaded section.

7. A tap according to claim 1, wherein a sealing ring is disposed in an annular groove of the outer annular flange of the piston element.

* * * * *